US008651850B2

(12) United States Patent
Jacob et al.

(10) Patent No.: US 8,651,850 B2
(45) Date of Patent: Feb. 18, 2014

(54) CLIP INTEGRATION OF PRESSURE TUBE MOLD CORES INTO HARDENED OMEGA-STRINGERS FOR THE PRODUCTION OF STIFFENED FIBER COMPOSITE SKIN SHELLS, IN PARTICULAR FOR AERONAUTICS AND ASTRONAUTICS

(75) Inventors: Torben Jacob, Beckdorf (DE); Ivar Wiik, Appel (DE)

(73) Assignee: Airbus Operations GmbH, Hamburg (DE)

( * ) Notice: Subject to any disclaimer, the term of this patent is extended or adjusted under 35 U.S.C. 154(b) by 616 days.

(21) Appl. No.: 12/502,671

(22) Filed: Jul. 14, 2009

(65) Prior Publication Data
US 2010/0007056 A1 Jan. 14, 2010

Related U.S. Application Data

(60) Provisional application No. 61/080,433, filed on Jul. 14, 2008.

(30) Foreign Application Priority Data

Jul. 14, 2008 (DE) .......................... 10 2008 032 834

(51) Int. Cl.
*A01J 21/00* (2006.01)
*A21C 3/00* (2006.01)
*B32B 3/10* (2006.01)
*B29C 65/00* (2006.01)
*B32B 37/00* (2006.01)

(52) U.S. Cl.
USPC ........... 425/403; 425/175; 425/179; 425/383; 425/385; 425/387.1; 425/392; 425/500; 425/501; 425/502; 425/503; 156/349; 156/383; 428/36.1; 428/131; 428/132; 428/133; 428/137; 428/139; 428/320.2

(58) Field of Classification Search
USPC .............. 425/175, 383, 385, 387.1, 388, 389, 425/392, 393, 403, 500, 501, 502, 503, 504, 425/179; 428/36.1, 36.4, 131, 132, 133, 428/137, 138, 139, 320.2; 156/292, 349, 156/383; 264/258
See application file for complete search history.

(56) References Cited

U.S. PATENT DOCUMENTS 2,920,357 A * 1/1960 Ericson .......................... 454/298
3,385,013 A * 5/1968 Severson ........................ 52/91.3
(Continued)

FOREIGN PATENT DOCUMENTS

DE 10 2006 031 335 1/2008 .............. B29C 33/76
DE 10 2006 031 336 1/2008 .............. B29C 33/76

*Primary Examiner* — Atul P. Khare
(74) *Attorney, Agent, or Firm* — Ingrassia Fisher & Lorenz P.C.

(57) ABSTRACT

The invention concerns a device for stiffening a flat component, a process for the production of a flat component, in particular a fiber composite component, and a fiber composite component. The device has a portion for producing a space for receiving a mold core for the transmission of a pressure for pressing the flat component and the device. It is characterised by means for positively lockingly and/or frictionally lockingly positioning the mold core in the space of the device. The process according to the invention includes the following steps: introducing the mold core into the portion of the device, positively lockingly and/or frictionally lockingly positioning the mold core in the portion of the device by means of the means, applying the device including the mold core to the non-hardened material layer or layers, pressing the material layers, and hardening the material layer or layers and joining the device to the material layer or layers.

13 Claims, 3 Drawing Sheets

(56) References Cited

U.S. PATENT DOCUMENTS

| | | | |
|---|---|---|---|
| 3,995,080 A * | 11/1976 | Cogburn et al. | 428/34.5 |
| 3,995,081 A * | 11/1976 | Fant et al. | 428/119 |
| 4,043,689 A * | 8/1977 | Spencer et al. | 403/252 |
| 4,198,034 A * | 4/1980 | Svirklys | 256/72 |
| 4,494,346 A * | 1/1985 | Gailey | 52/506.07 |
| 6,752,190 B1 * | 6/2004 | Boll et al. | 156/433 |
| 7,293,737 B2 * | 11/2007 | Engwall et al. | 242/590 |
| 8,043,554 B2 * | 10/2011 | Yip et al. | 264/573 |
| 2006/0208135 A1 * | 9/2006 | Liguore et al. | 244/117 R |
| 2007/0176327 A1 * | 8/2007 | Petersson et al. | 264/319 |
| 2008/0302912 A1 * | 12/2008 | Yip et al. | 244/119 |

* cited by examiner

CLIP INTEGRATION OF PRESSURE TUBE MOLD CORES INTO HARDENED OMEGA-STRINGERS FOR THE PRODUCTION OF STIFFENED FIBER COMPOSITE SKIN SHELLS, IN PARTICULAR FOR AERONAUTICS AND ASTRONAUTICS

PRIORITY

The present application claims priority from the U.S. Provisional Application 61/080,433, filed Jul. 14, 2008, and DE 10 2008 032 834.0, also filed Jul. 14, 2008, both of which are hereby incorporated by reference in their entireties.

FIELD OF THE INVENTION

The invention generally relates to the production of fiber composite components and, more particularly, the invention relates to systems and methods for stiffening fiber composite shells.

BACKGROUND OF THE INVENTION

It is generally known for flat components to be produced in the form of fiber composite components comprising one or more layers for example of carbon fiber reinforced plastic (CFRP). Those fiber composite components are stiffened with stringers of carbon fiber reinforced plastic in order to withstand the loadings which occur in the aircraft structure, with the lowest possible additional weight. In that respect a distinction is essentially drawn between two kinds of stringers: the T-stringer and the omega-stringer.

However support or mold cores are necessary for the production of stringer-stiffened fiber composite components in order to fix and support the semi-finished fiber materials, which are mobile in respect of shape, of the skin, and the stringers, in the desired arrangement, during the manufacturing procedure. A process known from the state of the art for producing a fiber composite component is what is referred to as the pressure tube process. That process is used for example when producing sporting items such as tennis rackets or in building sporting vehicles in order to produce cavities for example for stiffening, reducing weight or for producing cable ducts. In that respect, to produce the cavities, use is generally made of pressure tubes which are relatively soft and/or thin-walled and which therefore change in their shape in the production procedure and which in addition cannot assume an exactly predefined position in cross-section. Oversize folds and corner radii can therefore be randomly formed, within certain limits.

Hitherto that technology has been used in relation to relatively small or short components. In that case the pressure tube is introduced into the component in various ways.

SUMMARY OF THE INVENTION

The present invention concerns a process for the production of a fiber composite component, in particular for aeronautics and astronautics, a mold core for the production of such a fiber composite component and a fiber composite component having at least one stringer, which is produced by means of such a mold core and/or such a process.

The present invention further concerns a device for stiffening a flat component, in particular a fiber composite component having a portion for producing a space for receiving a mold core for the transmission of a pressure for pressing the flat component and the device, and a process for the production of the flat component.

Flat or areal components, devices of the aforementioned kind for stiffening such flat components and corresponding processes for the production of the flat components are known from the state of the art. Flat components are required in particular in shipbuilding and in aeronautics and astronautics in order for example to produce hulls and fuselages. The modern manufacture of ships' hulls or aircraft fuselages involves using preferably fiber composite materials to produce flat components.

The principle of the pressure tube process can also be used in the production of a flat component, for example a ship's hull or aircraft fuselage from a fiber composite component. Such a fiber composite component is hardened for example in an autoclave at pressures of up to 10 bars and at high temperatures. In that case the pressure tube serves as a mold core which transmits the pressure produced by the autoclave in the hardening operation to the device and the flat component, in particular to the skin of the fiber composite component. The device has a space for receiving that pressure tube. If now the device is to be integrated into the fiber composite component or on to the skin then the pressure tube on the one hand can be manually introduced into the device, for which purpose it will be noted however that a prepreg layer (prepreg stands for pre-impregnated fibers consisting of endless fibers and an unhardened plastic matrix) must be at least partially fitted on to the underside of the device so that the mold core does not fall out when the device is lifted and turned. It will be noted however that there is the disadvantage here that introducing the prepreg requires an additional working step and entails additional weight, both of which are undesirable. On the other hand, when dealing with straight parts, the pressure tube can be pulled into the device, as far as a given length. It will be noted however that in that case there is the danger of damage to the pressure tube and the formation of pressure tube folds which are transmitted to the fiber composite component upon integration as between the device and the skin. Both methods of introducing the pressure tube into the device involve the risk that the pressure tube slips, the pressure tube cannot be positioned exactly in the device and it is not possible to arrive at defined corner radius formation as inaccuracies in positioning of the pressure tube mean that it is fitted snugly into the corner regions of the device to differing extents.

To reduce the above described disadvantages of the prior art, it has been proposed that a corner profile in the form of a corner wedge be provided, which can comprise a braided band or a roving (a bundle of untwisted stretched fibers). That corner profile additionally reduces undefined accumulation of the fiber matrix (for example epoxy resin) which is used for hardening the fiber composite component, and the waviness of the fiber composite component. In addition crack formation in the fiber composite component is reduced by the provision of rounded configurations instead of corners. It will be noted however that inserting the corner wedge member requires an additional working step and in addition there is a certain degree of uncertainty in positioning of the separate corner wedge, in which respect the position thereof can no longer be corrected after integration between the device and the fiber composite or the skin prior to hardening because of its inaccessibility. Hitherto there has not been any automated handling of the corner wedge for industrial production.

Taking that art as the basic starting point, the object of the invention is to at least reduce the disadvantages of the state of the art and to provide a device and a process which can receive a mold core easily, quickly and by an automatable operation in a defined position, while the device is of a structure that is easy to manufacture.

That object is attained in that a device of the kind set forth in the opening part of this specification includes means for positively lockingly and/or frictionally lockingly positioning the mold core in the space of the device. By virtue of the device being equipped with such means it is possible for the position of the mold core in the device to be exactly established without an additional working step and/or an additional layer having to be introduced into the fiber composite. In addition the complexity of the procedural movements is reduced, whereby the mold core can be introduced into the space of the device in an automated mode.

A preferred embodiment of the device according to the invention is distinguished in that the means include a projection for positively locking positioning of the mold core. Such projections can be produced easily and without involving a large amount of additional material expenditure.

Advantageously a development of the device according to the invention provides that the projection is of such a configuration that the mold core is positioned clip-like or snap action-like. For that purpose the projections are reversibly elastically deformable. Introduction of the mold core into the device is not made difficult by that configuration of the projection and it is immediately apparent whether the mold core is at all correctly positioned, or not. If the projections should not lie around the mold core in clip-like or snap action-like fashion at a location, that can be easily corrected, for example by the mold core being pushed somewhat further into the space in the device.

An advantageous development is achieved if the projection is adapted to the shape of the mold core. That provides that the mold core bears against the projection over the largest possible surface area and point or line loadings are at least reduced. Thus stress peaks at the contact lines or surfaces of the mold core and the projection and consequently the loading both on the mold core and also the projection are reduced. Damage and deformation phenomena can be limited in that way.

Further advantages are afforded if the projection has a rounding with a radius. Stresses are distributed more uniformly within the device by means of the roundings and the formation of stress peaks is avoided. That reduces the probability of the projections breaking and consequently increases the service life of the device.

Preferably a further development of the device according to the invention in which the mold core has a second rounding with a second radius provides that the radius of the rounding corresponds to the second radius of the second rounding of the mold core. That configuration combines the advantages arising out of the fact that the mold core bears against the projection over a large area, with the advantages arising out of the configuration of the projections with roundings. The generation of stress peaks both within the mold core and the device and also at the contact surfaces of the mold core and the projection is substantially avoided.

A development of the device according to the invention provides that the projection has a slope. In that case the slope can involve any desired angle, in particular also a slightly negative angle, and can be of any desired length, as long as it is ensured that the mold core is securely received and positioned in the space in positively locking or frictionally locking relationship (see below in relation to negative angles). A slope can be particularly easily produced so that the manufacturing costs of the device can be reduced.

A further preferred development provides that the means have surfaces for frictionally locking positioning of the mold core. In this development it is possible to dispense with the provision of projections, thereby affording a further simplification in manufacture of the device. The surfaces must be so matched to the mold core that the force acting in the contact surfaces between the device and the mold core is at least so great that the resulting adhesion guarantees reliable positioning of the mold core in the space in the device. Therefore a sufficient clamping action must be exerted by the surfaces on the mold core. Otherwise no limit is placed on the design configuration of the surfaces, for example the size and the spacing thereof from each other. Thus for example the surfaces may have a structure which increases the adhesion between the mold core and the device, for example increased roughness or a groove structure. In particular the surfaces can involve negative slopes.

Preferably, in particular in the pressurised state, the mold core substantially fully fills the space. That therefore ensures that the mold core bears everywhere against the device and the skin and the pressure is transmitted over an area.

Advantageously the device is in the form of a stringer, in particular an omega-stringer. Stringers are distinguished by a high load-bearing capacity in conjunction with the skin while at the same time occupying a small amount of space and being low in weight and in addition can withstand in particular two-dimensionally directed loadings.

A further aspect of the present invention concerns a flat component like a fiber composite component including
   one or more material layers,
   a device for stiffening the flat component as set forth in one of claims 1 through 10, which is connectable to the material layer or layers, and
   a mold core for the transmission of a pressure for pressing the material layers and the device.

The device according to the invention makes it possible to markedly simplify the production of flat components, in particular the production of a fiber composite component, by reducing and simplifying the process steps. The non-defined accumulation of resin used for hardening the fiber composite component, cracking in the fiber composite component due to the provision of rounded-out portions and the waviness of the fiber composite component are markedly reduced. To stiffen the flat component, the device can be connected thereto. That can be effected by means of any suitable connecting procedure, for example by riveting or screwing. Additionally, or alternatively, the device (e.g., a stringer) can be glued in the hardened condition to an outer surface, which has not yet hardened (wet), of a material layer of the fiber composite component, also referred to as the skin, as is used in the present invention. If the device is in the form of a stringer, it can be made from a material which is matched to the material layers of the fiber composite/the skin so that the join between the stringer and the fiber composite/the skin can be particularly easily afforded, for example by adhesive means. The other advantages referred to in relation to the device also apply to the flat component and the fiber composite.

A further development of the flat component advantageously provides that the mold core is in the form of a pressure tube. The pressure tube can be connected to an internal space of an autoclave so that the pressure generated by the autoclave and the temperature produced by the autoclave can be introduced into the flat component, in particular into the fiber composite component, along the device, in particular along the stringer. It is possible in that way to easily implement uniform hardening and pressing of the material layers of the fiber composite component and uniform integration or connection of the stringer to the material layers. As mentioned hereinbefore in accordance with the invention the operation of introducing the pressure tube into the stringer can be automated. In that way manufacture of the fiber composite component can be simplified and thus made less expensive.

Preferably a development of the flat component provides that the material layer or layers is or are at least partially constructed from hardenable material such as fiber composite material, in particular carbon fiber or glass fiber reinforced plastic. In that way shell segments can be produced in an inexpensive and simple fashion, which are light and which nonetheless can be subjected to a high loading. In addition there is the possibility of the stringer being joined to the material layers by adhesive means, which is a simpler joining procedure in comparison for example with riveting or screwing.

A further aspect of the present invention concerns a process for the production of a flat component such as a fiber composite component, wherein the flat component includes:
 one or more material layers,
  a device for stiffening the flat component having a portion for producing a space for receiving a mold core for the transmission of a pressure for pressing the material layers and the device, and
  means for positively lockingly and/or frictionally lockingly positioning the mold core in the portion of the device,
 including the following steps:
 introducing the mold core into the portion of the device,
 positively lockingly and/or frictionally lockingly positioning the mold core in the portion of the device by means of the means,
 applying the device including the mold core to the non-hardened material layer or layers,
 pressing the material layers and the device, and
 hardening the material layer or layers and joining the device to the material layer or layers.

The process according to the invention is preferably carried out in the above-described sequence but other sequences are also conceivable.

The process steps of introducing the mold core and positioning it in positively locking and/or frictionally locking relationship, in particular introducing the pressure tube into the device and positioning it therein, in particular in the stringer, can be carried out according to the invention at a great distance in respect of time and space, from the other process steps. It is possible for those process steps to be performed by a supplier who supplies the device, in particular the stringer and the mold core, in particular the pressure tube, ready for use as a unit for manufacture, so that those process steps have an outsourcing potential.

If a fiber composite component is to be produced, whose material layers are made up of glass fiber or carbon fiber reinforced plastic, there is also the possibility of gluing the stringer to the material layers upon hardening and pressing of the layers. In that way hardening, pressing and joining can be effected in one working step, thereby reducing the complication and expenditure for manufacture of the fiber composite component.

The other advantages listed in relation to the device and the flat component or the fiber composite component equally apply to the process according to the invention.

In accordance with one embodiment of the present invention a device for stiffening a flat component (e.g., a fiber composite component) includes a portion for producing a space for receiving a mold core. The mold core transmits a pressure for pressing the flat component and the device. The device also has a means for lockingly positioning the mold core in the space of the device. For example, the means for lockingly positioning the mold core may positively lock the mold core in the space of the device. Additionally or alternatively, the means for lockingly positioning the mold core may frictionally lock the mold core in the space of the device.

In those embodiments in which the means for locking positively locks the mold core, the device may include a projection that positively locks the position of the mold core. The projection may be configured such that the mold core is positioned clip-like or snap action-like. The projection may also be adapted to the shape of the mold core and/or have a projection rounding with a radius. Similarly, the mold core may have a mold core rounding with a second radius that corresponds to the radius of the projection rounding. In accordance with some embodiments, the projection may have a slope. In some embodiments which frictionally lock the mold core, the means for lockingly positioning the mold core may have at least one surface for frictionally locking the positioning of the mold core.

In accordance with additional embodiments, the mold core may substantially fully fills the space within the device. The device may be a stringer, such as an omega-stringer.

In accordance with further embodiments, a flat component such as a fiber composite component (e.g., for shell segments) may include one or more material layers, a device for stiffening the flat component, and a mold core (e.g., a dimensionally-stable, cross-sectionally shaped pressure tube). The device for stiffening the flat component may be connectable to the one or more material layers and may have a portion for producing a space, and a locking means. The mold core may transmit a pressure for pressing the material layers and the device. The space of the device may receive the mold core, and the locking means may lockingly positioning the mold core in the space. The one or more material layers may be, at least partially, constructed from hardenable material such as fiber composite material (e.g., carbon fiber or glass fiber reinforced plastic).

In accordance with other embodiments, a method for producing a flat component such as a fiber composite component (e.g., for shell segments) may first introduce a mold core into a portion of a device, The flat component may have one or more material layers, and the device may be configured to stiffen the flat component. The portion of the device may produce a space for receiving the mold core and the device may be connectable to the one or more material layers. The device may also include a means for lockingly positioning the mold core within the portion of the device. The mold core may transmit a pressure for pressing the material layers and the device.

The method may also include lockingly positioning the mold core in the portion of the device using the means for lockingly positioning the mold core, and applying the device, including the mold core, to one or more non-hardened material layers of the flat component. The method may then press the material layers using the mold core, and harden the material layer or layers to join the device to the one or more material layers.

In accordance with some embodiments the means for lockingly positioning the mold core may positively lock the mold core in the space of the device, and the method may lockingly positioning the mold core by positively locking the mold core in the portion of the device. Additionally or alternatively, the means for lockingly positioning the mold core may frictionally locks the mold core in the space of the device, and the method may lockingly positioning the mold core by frictionally locking the mold core in the portion of the device.

BRIEF DESCRIPTION OF THE DRAWINGS

Although it is possible to apply it to any fiber composite components the present invention and the underlying objectives thereof are described in greater detail hereinafter with reference to flat, stringer-stiffened carbon fiber plastic (CFP) components, by reference to the following Figures in which.

DETAILED DESCRIPTION OF SPECIFIC EMBODIMENTS

Figure 1:
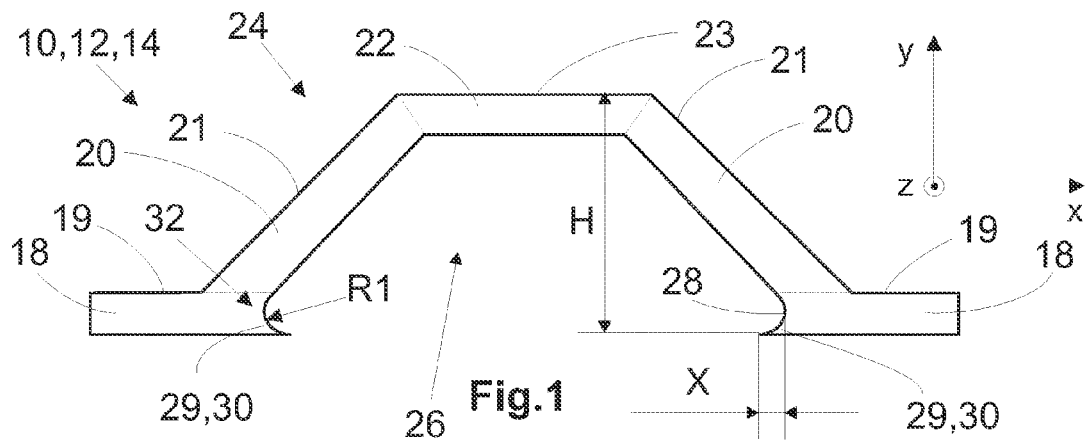
FIG. 1 shows the device according to the invention in the form of an omega-stringer in a first embodiment.

FIG. 1 shows the device 10 according to the invention which is in the form of an omega-stringer 12 in a first embodiment, in which respect stringers 14 can be used in any other conceivable design configuration, for example a T-stringer. The omega-stringer 12 includes a wall 16 having respective first, second and third wall portions 18, 20, 22 with a first, a second and a third surface 19, 21 and 23. The wall portions 18, 20 and 22 respectively go into each other. The first and third surfaces 19 and 23 of the first and third wall portions 18 and 22 extend substantially along an x-axis in a co-ordinate system defined in FIG. 1. The second surface 21 of the second wall portion 20 extends at a freely selectable angle to the first and third surfaces 19 and 23 respectively. The individual wall portions 18, 20 and 22 can be of any desired dimensions. The height H, produced thereby, of the omega-stringer 12 can be 30 mm. On the one hand that provides for stiffening of a later fiber composite component 46 (see FIGS. 5 and 6), while on the other hand that affords a portion 24, by means of which a space 26 is defined. In addition, at the end 28 of the first wall portion, said end pointing towards the space 26, the device 10 has means 29 for positively locking and/or frictionally locking positioning of a mold core 36 (see FIG. 2) in the space 26 of the device 10 in the form of a projection 30. In the embodiment shown in FIG. 1 that projection 30 has a rounding of a freely selectable radius R1 which for example can be 3 mm. A longitudinal axis L of the device 10 extends substantially along the z-axis defined by the co-ordinate system (see FIG. 6).

Figure 2:
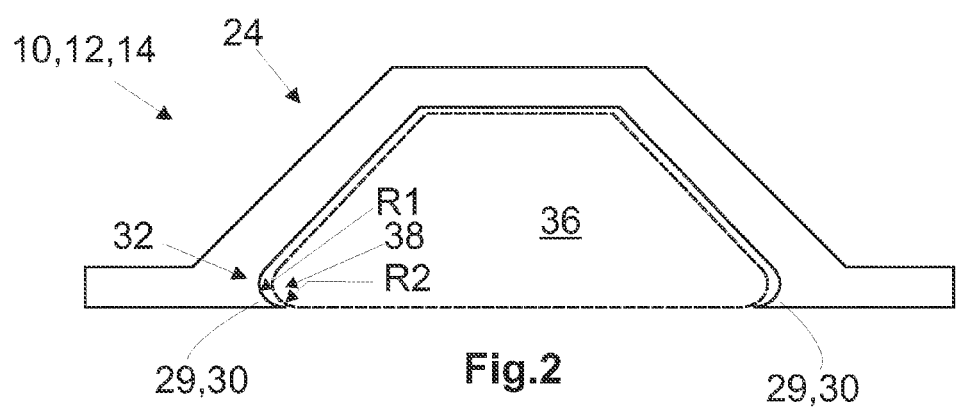
FIG. 2 shows the omega-stringer shown in FIG. 1 with a mold core received therein.

FIG. 2 shows the omega-stringer 12 illustrated in FIG. 1, together with the mold core 36 introduced into the space 26. For the sake of improved distinguishability, the contour of the mold core 36 is shown in broken line and has a certain undersize in relation to the space 26. The mold core 36 however can also be of such dimensions that it completely fills up the space 26, as is the case in FIG. 4. The projections 30 are so selected that they form an undercut configuration X and at least partially embrace the mold core 36 as soon as it is introduced into the space 26. In addition the mold core 36 is positioned in the space 26 in positively locking relationship by the projections 30 and in particular the mold core 36 is prevented from dropping out, for example when lifting or turning the omega-stringer 12. In the illustrated example the mold core 36 is adapted to the shape of the space 26, in particular it has a second rounding 38 of a second radius R2 corresponding to the radius R1 of the rounding 32 of the projections 30.

Figure 3:
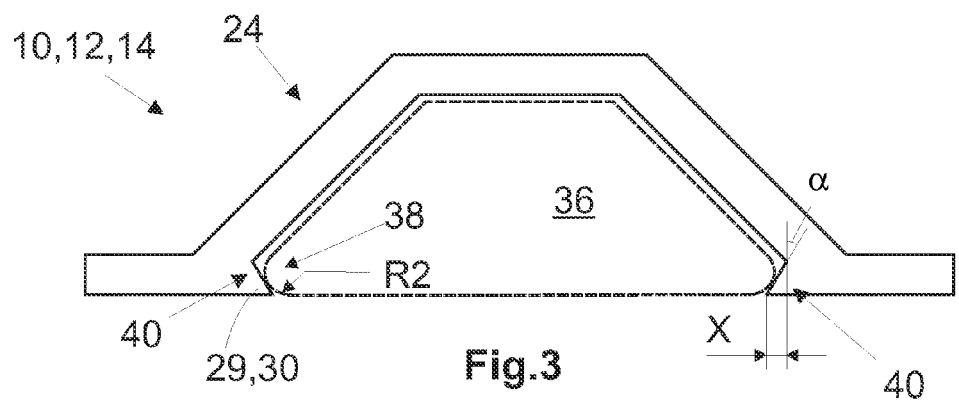
FIG. 3 shows a second embodiment of an omega-stringer with a mold core received therein.

FIG. 3 shows a second embodiment of the device according to the invention in the form of the omega-stringer 12. In this case the projections 30 are in the form of a slope 40, wherein an angle α included by the slope 40 with the vertical can be selected as desired as long as it is ensured that the mold core 36 is securely positioned in the space 26. The angle α can assume in particular values in the region of −5° to +450.

In addition the slopes 40 can also be of any desired dimensions. In this embodiment the mold core 36 is of precisely the same shape as in FIG. 2, but it is apparent that the mold core 36 can be so shaped as to be adapted to the slopes 40 of the projections 30. The undercut configuration X produced by the projections 30, that is to say the extent of the projections 30 in the x-direction, can be selected to be as desired, irrespective of its configuration, and can be for example 2 mm. Slightly negative values are also conceivable, as long as it is possible to guarantee a sufficiently firm clamping seat. Otherwise the omega-stringer is the same in construction as that shown in FIG. 1.

Figure 4:
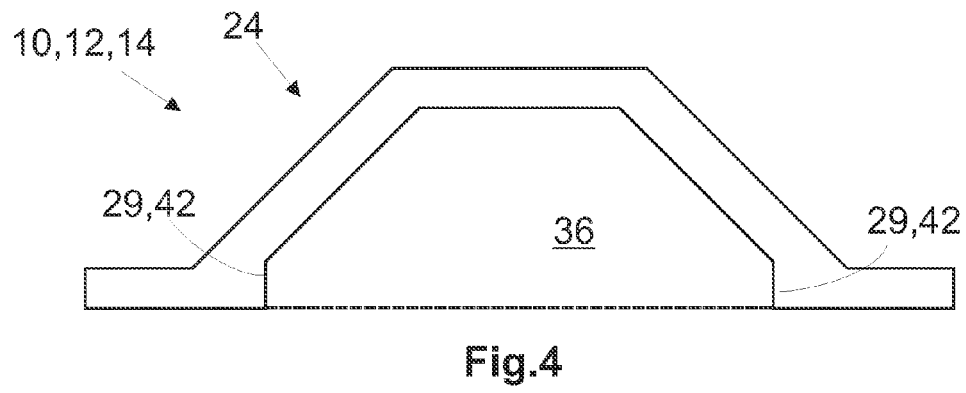
FIG. 4 shows a third embodiment of an omega-stringer with a mold core received therein, FIGS. 5a) through 5d) show the essential steps in a process according to the invention for the production of a flat component using an omega-stringer in accordance with the first embodiment and a mold core in the form of a dimensionally-stable, cross-sectionally shaped pressure tube.

FIG. 4 shows the omega-stringer 12 in a third embodiment. In this case it does not have any projections. The mold core 36 is positioned in the space 26 by way of surfaces 42 which are of such a configuration that they exert a clamping action on the mold core 36 so that the mold core 36 is held in the space 26. In addition in this example the mold core 36 completely fills up the space 26 and is therefore of a shape corresponding to that of the space 26. That prevents the mold core 36 from being able to move in the space 26. When the mold core 36 is completely introduced into the space 26 consequently its position is uniquely fixed. Otherwise the omega-stringer is identical to the structure shown in FIGS. 1 and 2.

Figure 5:
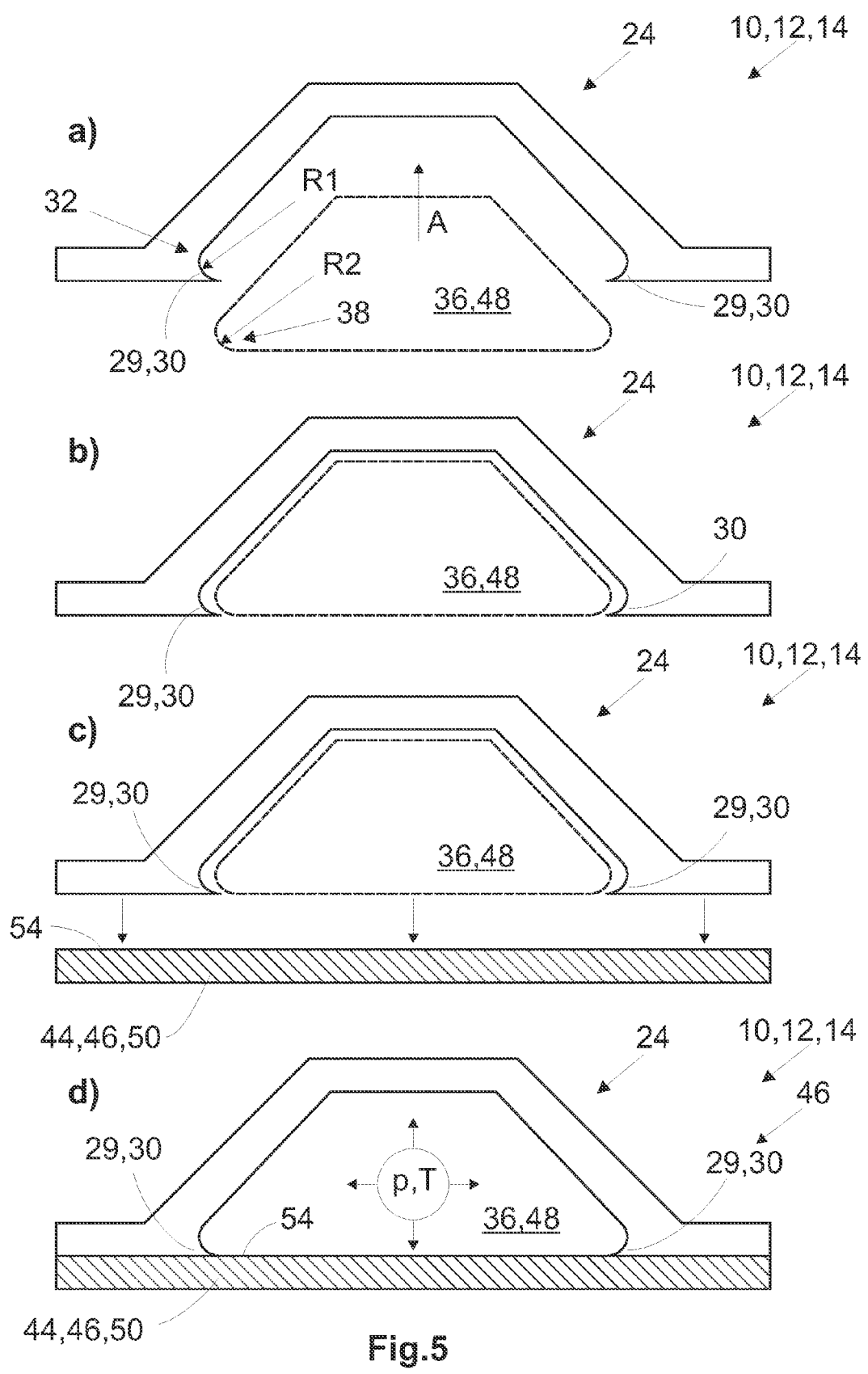

FIGS. 5a) through 5d) show the essential steps in a process according to the invention for the production of a flat component 44, in particular a fiber composite component 46. The illustrated example uses the omega-stringer 12 shown in FIGS. 1 and 2. The mold core 36 used is a dimensionally-stable, cross-sectionally shaped pressure tube 48 and is of a shape corresponding to that shown in FIGS. 2 and 3. To simplify the view, the parts of the omega-stringer 12 and the mold core 36, which have already been discussed in relation to FIGS. 1 through 3 and which are not essential to the process, are omitted in the illustration of the process steps in FIGS. 5a) through 5d). In the first step shown in FIG. 5a) the pressure tube 48 is introduced into the space 26 in the omega-stringer 12 substantially in the direction indicated by the arrow A. The pressure tube 48 is pushed into the space 46 by a force until it briefly elastically deforms the projections 48 and/or the tube itself is briefly elastically deformed. When the pressure tube 48 is completely introduced into the space 26 the tube and the projections 30 resume their original position and at least partially embrace the pressure tube 48 so that it can no longer fall out of the space 26. That corresponds to a typical clip-like or snap action-like fixing. That situation is reached in the process step shown in FIG. 5b. The omega-stringer 12 is then applied to a material layer 50 of the fiber composite component 46, together with the pressure tube 48 disposed in the space 26, as shown in FIG. 5c. That material layer 50 can be the single material layer 50 of the fiber composite component 46, but it is also possible to provide a plurality of material layers 50. The surface with which the material layer 50 comes into contact with the omega-stringer 12 represents a skin 54. In the step shown in FIG. 5c) the material layer 50 preferably comprising carbon fiber or glass fiber reinforced plastic, in particular the skin 54, is not hardened (wet). Preferably the omega-stringer 12 is produced from the same material as the material layer 50. In the next step shown in FIG. 5d) the pressure tube 48 is connected to the interior of an autoclave (not shown) and acted upon with a given pressure and a given temperature. Preferably an inert gas such as nitrogen is used for that purpose. Meanwhile, the parts to be combined (e.g., the omega stringer 12, the material layer 50, and the pressure tube 48) may be covered with a vacuum membrane (not shown). During the production process (e.g., when connected to the autoclave), the autoclave may apply a first negative pressure between the vacuum membrane and the parts (e.g., the omega stringer 12) and a second negative pressure within the omega stringer 12 (e.g., within the space 26 of the omega stringer 12) (see FIG. 5). In some embodiments, the pressure of the first vacuum may be equal to the second such that the pressures equalize each other. The negative pressures may help prevent the pressurisation effect from lifting the components (e.g., the omega stringer) off of the material layer 50.

By virtue of the pressurisation effect the pressure tube 48 expands a little so that cavities which can be formed between the omega-stringer 12 and the pressure tube 48 are filled up. In addition the omega-stringer 12 and the skin 54 of the material layer 50 are pressed together by virtue of the pressurisation effect and the material layer 50 is hardened because of the effect of temperature. Additionally, in the hardening operation the omega-stringer 12 is caused to fixedly adhere to the material layer 50 and the fiber composite component 46 is produced.

Figure 6:
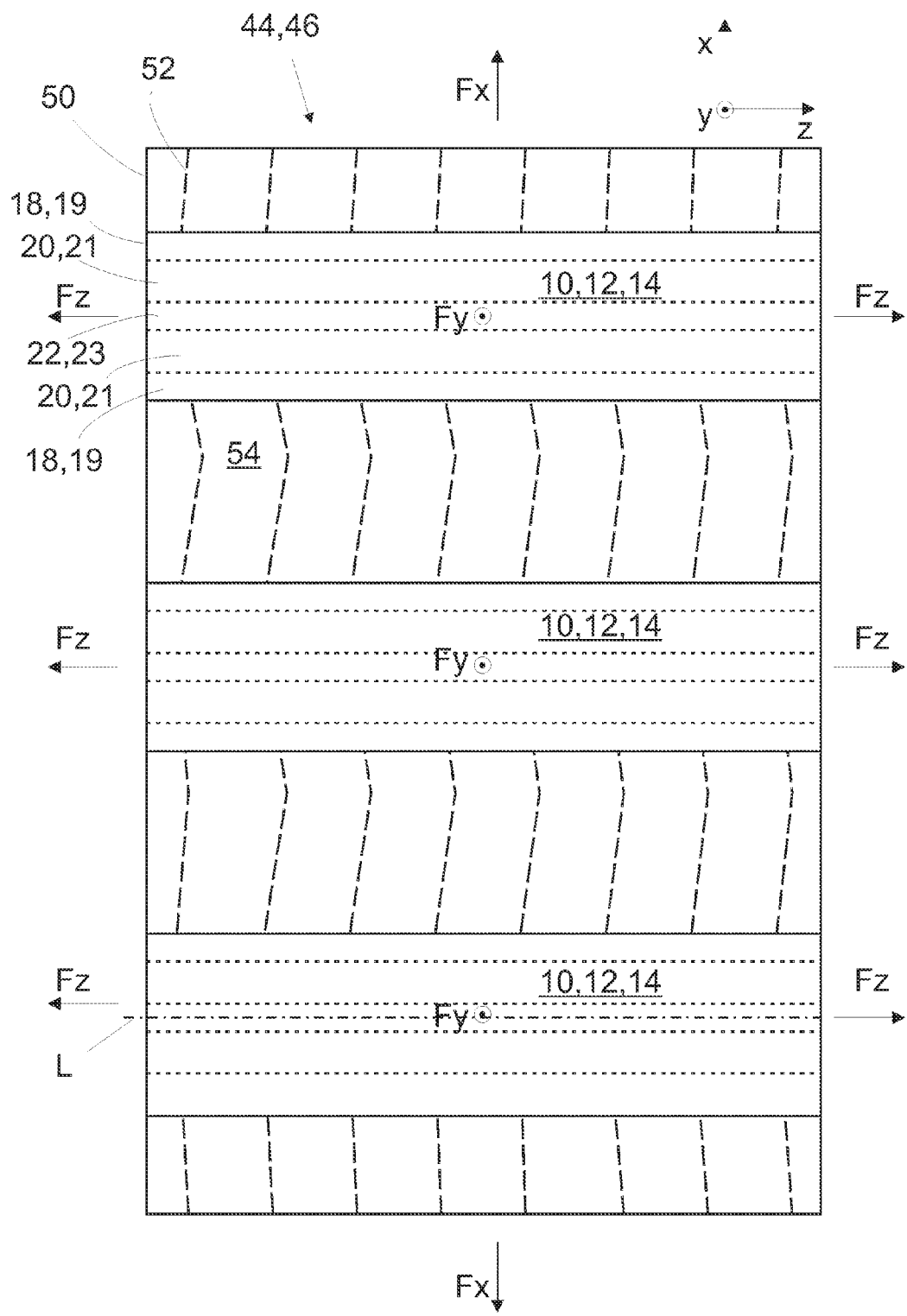
FIG. 6 shows a flat component, in particular a fiber composite component, stiffened with an omega-stringer in accordance with one of the embodiments shown in FIGS. 1 through 3.

FIG. 6 shows a plan view of the skin 54 of a flat component 44, in particular a fiber composite component 46, which is stiffened with an omega-stringer in accordance with one of the embodiments shown in FIGS. 1 through 3. The fiber composite component 46 is produced by the process shown in FIG. 5. In this case the material layer 50 comprises carbon fiber or glass fiber reinforced plastic. Corresponding fibers 52 are shown by the broken lines. The omega-stringers 12 are preferably applied to the material layer 50 in such a way that they extend substantially along the z-direction defined by the co-ordinate system, but the orientation of the omega-stringers 12 is not an important consideration for stiffening of the fiber composite component.

The present invention has been described in detail by means of embodiments by way of example, in which respect obvious modifications and additions can be effected. In particular the configuration of the projections 30 is not limited to the illustrated embodiments. It would be possible for example for the projections 30 to be designed to be displaceable so that the mold core 36 or the pressure tube 48 can be locked.

What is claimed is:

1. An omega-stringer for stiffening a flat component, the omega-stringer comprising:
  a body portion formed of pre-hardened fiber-reinforced plastic material and having an opening along a perimeter thereof which extends into an interior space, the interior space for receiving a dimensionally stable, cross-sectionally shaped mold core pressing the flat component and the stringer; and
  means for positioning the mold core in a locking manner which is clip-like or snap action-like within the interior space of the body portion.

2. A stringer according to claim 1, wherein the means for positioning the mold core comprises a projection for positioning the mold core in a positively locking manner.

3. A stringer according to claim 2, wherein the projection is adapted to the shape of the mold core.

4. A stringer according to claim 2, wherein the projection has a rounding with a radius.

5. A stringer according to claim 2, wherein the projection has a slope.

6. A fiber composite component comprising:
  one or more fiber composite material layers; and
  an omega-stringer stiffening the fiber composite component and connectable to the one or more material layers,
  wherein the stringer is formed of pre-hardened fiber-reinforced plastic material and comprises:
    a body portion having an opening along a perimeter thereof which extends into an interior space, the interior space for receiving a dimensionally stable, cross-sectionally shaped mold core pressing the one or more material layers and the stringer; and
    means for positioning the mold core in a locking manner which is clip-like or snap action-like within the interior space of the body portion.

7. A fiber composite component according to claim 6, wherein the mold core is a dimensionally stable, cross-sectionally shaped pressure tube.

8. A fiber composite component according to claim 6, wherein the fiber composite of the one or more material layers is carbon fiber or glass fiber reinforced plastic.

9. A fiber composite component according to claim 6, wherein the means for positioning the mold core comprises a projection for positioning the mold core in a positively locking manner.

10. A fiber composite component according to claim 9, wherein the projection is adapted to the shape of the mold core.

11. A fiber composite component according to claim 9, wherein the projection has a rounding with a radius.

12. A fiber composite component according to claim 9, wherein the projection has a slope.

13. A fiber composite component according to claim 6, wherein the mold core is a dimensionally stable, cross-sectionally shaped pressure tube.

* * * * *